Figure 1:
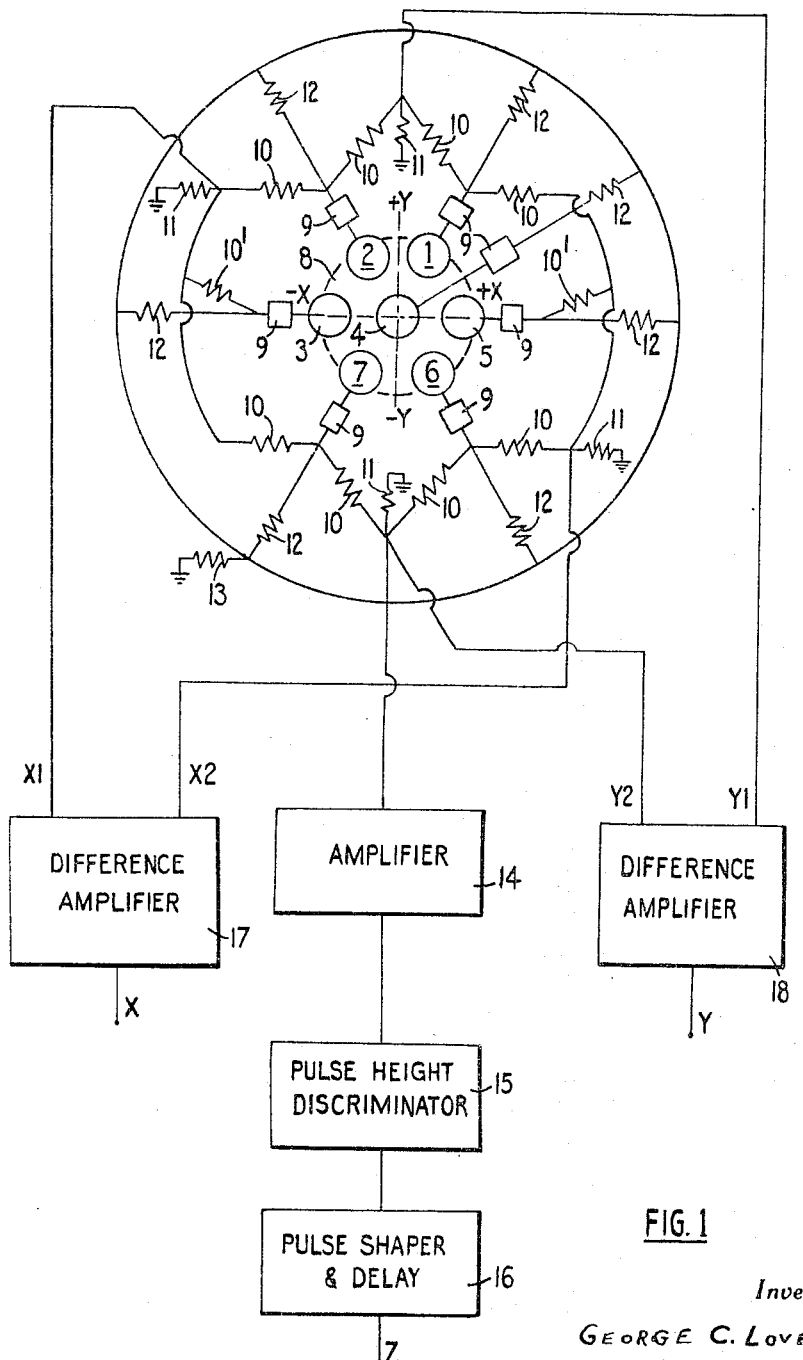

United States Patent Office 3,327,116
Patented June 20, 1967

3,327,116
RADIATION DETECTOR HAVING A PLURALITY OF PHOTO-RESPONSIVE MEANS VIEWING OVERLAPPING AREAS OF A SCINTILLATOR WINDOW
George Christopher Loveday, Eastwood, England, assignor to E. K. Cole Limited, Southend-on-Sea, England
Filed Nov. 29, 1963, Ser. No. 326,730
Claims priority, application Great Britain, Nov. 30, 1962, 45,277/62
5 Claims. (Cl. 250—71.5)

It has been proposed to reproduce e.g. in a cathode ray oscilloscope the image of random scintillations appearing on the window of a scintillator e.g. such as thallium-activated sodium iodide crystal, bombarded by penetrative radiation such as gamma rays. To effect this the window of the scintillator had spaced from it several photo-multiplier tubes "viewing" overlapping areas of the window and arranged in a circuit such that by appropriate grouping the tubes provided resultant outputs which were a function of position of the scintillations with respect to predetermined co-ordinates lying in the plane of the window of the scintillator. The transitory nature of the oscilloscope image was not always adequate, though this could be improved somewhat by the use of a memory tube.

The present invention relates to a radiation detector of the type in which a plurality of photo-multiplier tubes is disposed as above with respect to a scintillator and in which the outputs from the grouped tubes are derived which are a function of the spacing from the predetermined co-ordinates, of the scintillation causing that output.

The general arrangement of the photo-multiplier tubes with relation to the scintillator and the connections between the tubes to the output circuits is as described in U.S.A. Patent No. 3,011,057 in the name of Hal O. Anger.

The present invention is a radiation detector of the said type in which means are provided for deriving from the tubes a pulse output whose amplitude is a function of the position of the projection of the scintillation on the window of the scintillator and having means which selectively use output pulses which lie between predetermined amplitude limits so as to obtain an indication of those scintillations only, which are received within a predetermined area or areas of the window.

We have used the term "window" to means the surface of the scintillator crystal from which light is adapted to be emitted and used in the detector, whether or not this crystal surface is provided with a transparent cover.

We shall use the term "channel width" to indicate pulses lying between a predetermined upper amplitude limit and a predetermined lower amplitude limit.

The present invention is also a radiation detector of the said type, in which, of the window of the scintillator, the area observed lies within and extends to the edges of a strip whose width is determined by the setting, in a circuit feeding a pulse counter or indicator of the channel width as defined, for pulses resulting from the comparison of pulses received from photo-multiplier tubes, situated at least mainly on one side of a predetermined co-ordinate and pulses received from photo-multiplier tubes situated at least mainly on the other side of said co-ordinate.

Where, as will usually be the case, and area under observation is to lie within such a strip as aforesaid, but to extend over only a part of the length thereof, this is provided for, according to the invention, by setting, in the counter circuit, the channel width for pulses resulting from the comparison of pulses from the photo-multiplier tubes situated at least mainly on one side of a second predetermined co-ordinate which is at right angles to the first said co-ordinate, and the pulses received from the photo-multiplier tubes situated at least mainly on the other side of the said second co-ordinate.

In one arrangement, pulses from the two channels are gated and fed to a counter preferably arranged to give a direct indication of the scintillations per unit time, received from the area under observation.

We may impress pulses, derived from the two channels, on an indicator to give a visual indication of the scintillation occurring over the whole of the window of the scintillator, the said impressed pulses being used to increase the relative intensity of the indications which lie within the particular area of observation. By this expedient we provide a convenient visual indication of the area or areas over which the scintillations are counted.

Figure 2:
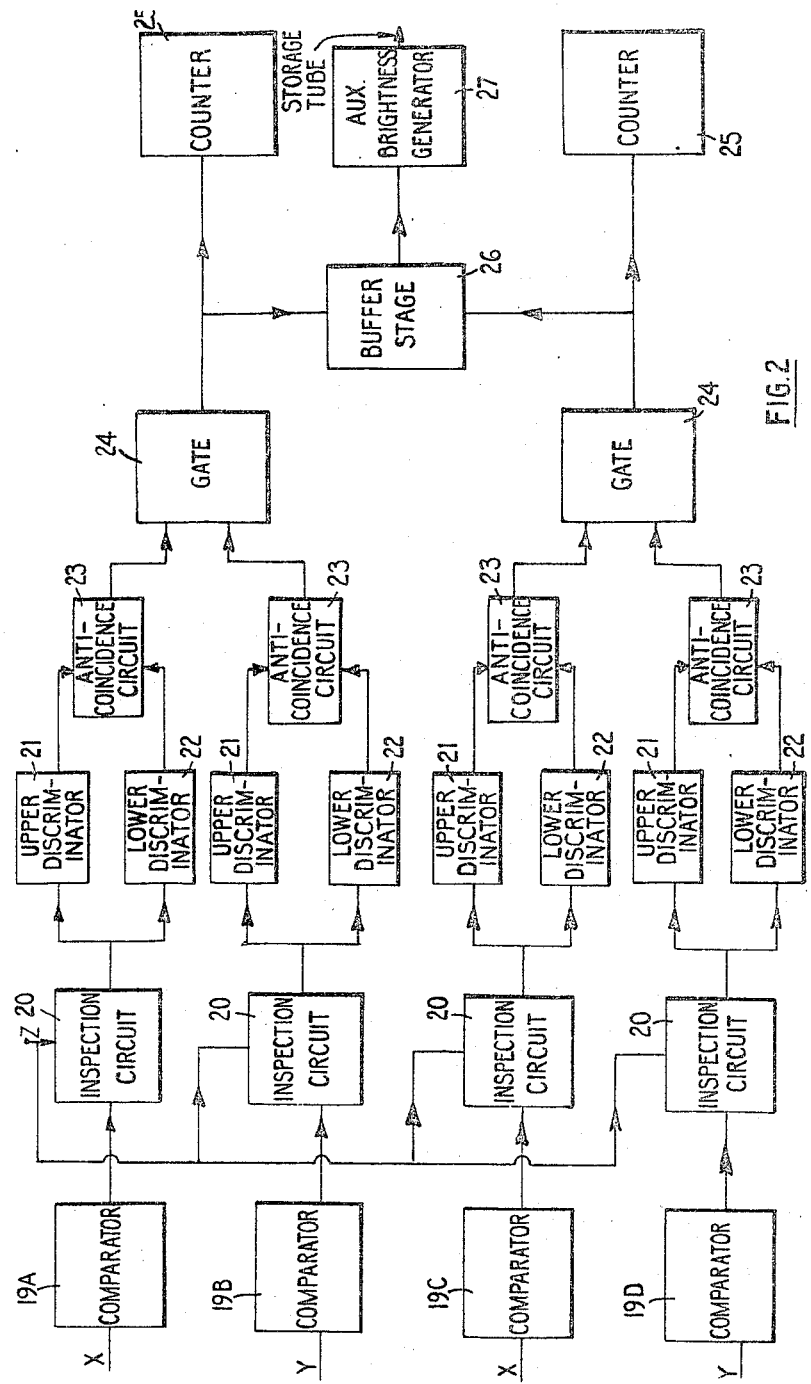
Figure 3:
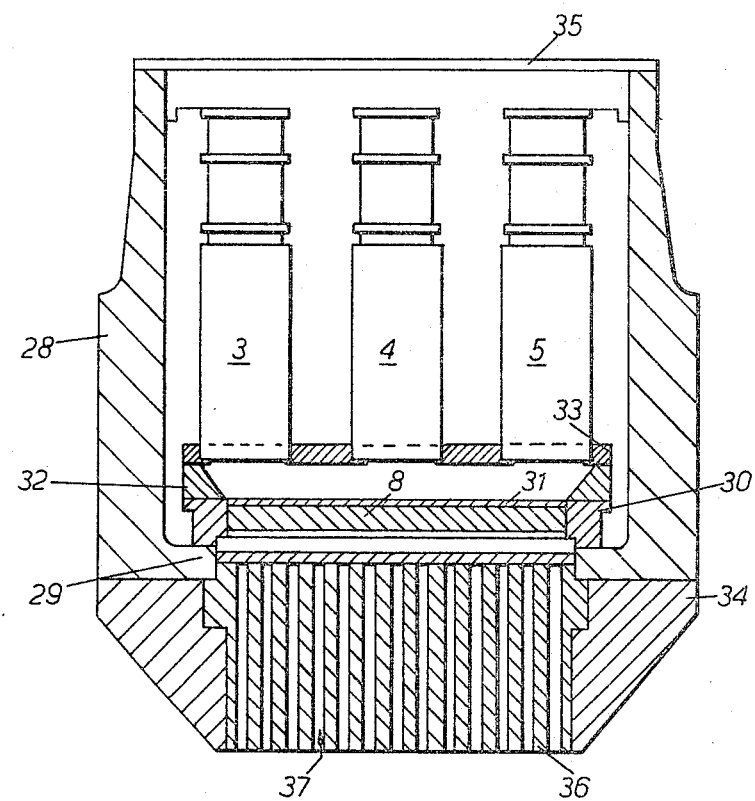

The invention will be more readily understood by a perusal of the following description having reference to the accompanying drawings, in which:

FIGURE 1 is a circuit diagram partly in block schematic of a form of radiation detector described in said U.S.A. patent, FIGURE 2 is a block schematic diagram of a circuit used with that of FIGURE 1 according to the present invention and FIGURE 3 is a sectional side elevation of a radiation detector similar to that described in said U.S.A. patent.

The radiation detector shown in FIGURE 3 comprises a casing 28 of lead which is of generally cylindrical shape and has a cover 35. At the lower end of the casing is an inward peripheral projection 29 supporting a housing 30 for a scintillator 8 of thallium-activated sodium iodide crystal and of disc form. Above the scintillator 8 is a glass cover 31 forming a window for the scintillator. It is visualised that the glass cover 31 may be dispensed with. The housing 30 supports a light pipe 32 which in turn supports a disc 33 having a plurality of apertures to accommodate the light-sensitive ends of photomultiplier under 1–7. Three of the tubes only are shown in FIGURE 3. The tube 4 is disposed centrally in the disc 33, the remaining tubes being equally spaced from one another and from the tube 4 as shown in FIGURE 1. The light-sensitive ends of the tubes are all positioned at the same height above the scintillator 8 with each tube viewing a major portion of the scintillator. The casing 28 carries a nose section 34 on which is mounted a collimator 36 having a plurality of holes 37. The collimator may be of various other forms and the construction shown is by way of example only. For example, the collimator may be of the pin-hole type.

When a source of penetrative radiation, e.g. gamma rays, is appropriately positioned near the lower end of the collimator 36, the penetrative radiation passing through the holes 37 will cause scintillations in the scintillator 8. By positioning the tubes 1–7 as shown, the quantity of light received by each tube due to such a scintillation will be dependent on the position of the scintillation in the scintillator 8.

In FIGURE 1, the seven multiplier tubes 1–7 are arranged, as shown, above the scintillator 8. The angle of view of the tubes and the distance between the scintillator and the tubes are selected so that the tubes may each receive signals emitted from a large surface area of the scintillator. The output of each of the tubes 1–7 is connected to the one of seven amplifiers 9 which is individual to that tube. In order to explain the operation of the invention an X axis and a Y axis are shown on the tube assembly, the axes crossing at the centre of the tube 4. The X axis is shown passing through the tubes 3 and 5. In one direction, the Y axis passes between the tubes 6 and 7 while in the other direction the Y axis passes between the tubes 1 and 2. In order to sense the position of a scintillation in 8, the positions of this scintillation with respect to both the X axis and Y axis are required. Considering first the X negative side of the Y axis, the outputs of the tubes 2, 3 and 7 are each connected via a resistor 10 so that a combined output X1 may be developed across a grounded resistor 11. The value of the resistor at the output of the tube 3 has been referenced $10^1$ its value being one half that of the resistors 10. This is because, in the arrangement shown, the tube 3 is twice as far from the Y axis as are the tubes 2 and 7. The outputs of the tubes 1, 5 and 6 on the X positive side of the Y axis are combined in a similar manner to those on the X negative side of the Y axis to provide an output X2. The outputs of the tubes 1 and 2 on the Y positive side of the X axis and the outputs of the tubes 6 and 7 on the Y negative side of the X axis are combined to provide outputs Y1 and Y2 respectively, in a similar manner to that described above. The outputs X1 and X2 are supplied to a difference amplifier 17 of known type which provides an output X. This pulse output is arranged to be positive when a pulse developed at X2 is greater than a corresponding pulse at X1 and negative when a pulse developed at X1 is greater than a corresponding pulse developed at X2. The pulse outputs Y1 and Y2 are connected to an amplifier 18 which provides a pulse output Y. This amplifier is similar to the amplifier 17 and provides a positive output when Y1 is greater than Y2 and a negative output when Y2 is greater than Y1. The pulse outputs from the amplifiers 17 and 18 will thus each have an amplitude which is a function of the position of the scintillation in the scintillator 8 with respect to the co-ordinates X and Y. The amplifiers 9 are each connected via a resistor 12 to form a combined output across a grounded resistor 13. This output is fed via an amplifier 14, a pulse height discriminator 15 and a pulse shaper and delay circuit 16 to provide an output Z. The operation of the discriminator 15 is arranged so that pulses will be developed at Z only when the corresponding scintillations in 8 are due to a photoelectric recoil from a gamma-ray of a predetermined energy level or lie between predetermined levels of energy. The outputs X, Y and Z are connected to similarly referenced input terminals in FIGURE 2.

Referring now to FIGURE 2, the input X is connected to two comparators 19A and 19C while the input Y is connected to comparators 19B and 19D. The input pulses fed to each comparator are compared with a reference voltage which may be either positive or negative. The reference voltage may be adjusted by a variable control. Each comparator is arranged so that when the reference voltage is positive, positive pulses will be developed at the output of the comparator only when the corresponding input pulses are positive and have an amplitude which is at least equal to the reference voltage. Alternatively, when the reference voltage is negative, positive pulses will be developed at the output of the comparator only when corresponding input pulses are either positive or if negative have an amplitude which is less negative than the reference voltage. The output of each comparator is connected to an inspection circuit 20, to which the output Z of FIGURE 1 is applied, and thence to a discriminator having an upper discriminator 21 and a lower discriminator 22. Pulses are passed by the inspection circuit 20 only when a corresponding pulse is received at Z. The lower discriminator 22 is arranged to provide an output pulse only when a corresponding pulse at its input has an amplitude which exceeds a predetermined level, which level is constant. The upper discriminator 21 is arranged to provide an output pulse only when a corresponding pulse at its input exceeds a predetermined level. The discriminator 21 is provided with a variable control to adjust the predetermined level and it is arranged that the predetermined level is more positive than the fixed bias of the discriminator 22. The outputs of the discriminators are fed to an anti-coincidence circuit 23 which is adapted to supply an output to a gate 24 when a pulse is received only from the discriminator 22. Each of the gates 24 supplies an output to its respective counter 25 when coincident pulses are received at its two inputs, one of which is derived from an X input while the other is derived from a Y input. Normally the counters 25 are adjusted to count the number of pulses received in a predetermined time. The outputs of the gates 24 are also connected to a buffer stage 26 and thence via an auxiliary brightness generator 27 to the electron gun assembly of a storage tube (not shown).

The operation of the circuit of FIGURE 2 is perhaps most easily explained by a specific example. Suppose that it is desired to read-out the scintillations occurring within a predetermined area of the scintillator between the positive lengths of the X axis and the Y axis, and that the projections from the extremities of this area cross the X axis at 5 and 7 cms. and the Y axis at 6 and 9 cms., these distances being measured from the intersection of the axes. Accordingly, the signals which are to be sampled are those of $+X$ and $+Y$, i.e. as appearing in the upper right hand quadrant of 8 in FIGURE 1. The variable control in the comparator 19A is then set to a value which gives a reference voltage to the pulses which is characteristic of scintillations occurring at a distance of 5 cms. from the Y axis. The variable control in the associated upper discriminator 21 is set so that it provides an output pulse only when a corresponding input pulse has an amplitude characteristic of scintillations appearing at the window at a distance of 7 cms. from the Y axis. The variable controls in the comparator 19B and the upper discriminator 21 associated with the Y input are set in a similar manner to that described above. The input Z to the associated inspection circuits 20 is suitably delayed in the pulse shaper and delay circuit 16 of FIGURE 1 so that pulses are accepted by an inspection circuit from its associated comparator 19 only when those pulses are derived from a scintillation due to a photoelectric recoil from a gamma-ray of a predetermined energy level. Since the anti-coincidence circuits 23 supply an output only when a pulse is received from discriminator 22 and no corresponding pulse is received from the discriminator 21, the associated gate 24 will have two inputs when a scintillation occurs in the selected area as described above. Accordingly, the pulses fed to the counter 25 are those which are derived from scintillations of above a predetermined intensity occurring within the selected area. Preferably the variable controls of the comparators 19 and the upper discriminators 21 are calibrated in distance so that predetermined areas of the scintillator may be readily selected and indicated. The pulses developed at the outputs of the gates 24 may also be used as shown, to increase the brightness of the sampled area on the screen of the storage tube (not shown). The comparators 19C and 19D, and their associated circuitry, may be used to obtain a pulse count of the scintillations occurring in any other predetermined area of the scintillator.

I claim:
1. In a radiation detector a scintillator responsive to bombardment by penetrative radiation, a window of the scintillator, photo-responsive means viewing said window, said photo-responsive means comprising a plurality of photo-multiplier tubes whose photo-cathodes view overlapping areas of said window, an output circuit for the photo-response means providing pulse outputs whose amplitudes are a function of the position of the scintillations with respect to predetermined co-ordinates lying in the plane of said window, pulse amplitude discriminating means in said output circuit selecting those pulses which are derived from scintillations occuring in a predetermined sub-area of the window of the scintillator said pulse amplitude discriminating means having a first channel which is fed by pulses resulting from the comparison of pulses received from the photo-multiplier tubes situated at least mainly on one side of a predetermined co-ordinate on the scintillation window and pulses received from the photo-multiplier tubes situated at least mainly on the other side of said co-ordinate so that strip of the window is under observation, and means in the output of said discriminating means for indicating the scintillations occuring in said sub-area.

2. A radiation detector according to claim 1, in which the means for indicating the scintillations occuring in said sub-area is a pulse counter.

3. A radiation detector according to claim 1 wherein means are provided in said pulse amplitude discriminating means to comprise a second channel which is fed by pulses resulting also from the comparison of pulses received from the photo-multiplier tubes situated at least mainly on one side of a second predetermined co-ordinate on the scintillation window and pulses received from the photo-multiplier tubes situated at least mainly on the other side of said second co-ordinate, so that a sub-area only of the said strip is under observation.

4. A radiation detector according to claim 3 comprising means for feeding the pulses of the two channels to a gate whose output is fed to a pulse counter arranged to give a direct indication of the scintillations per unit time received from the sub-area under observation.

5. The radiation detector according to claim 4 in which means are provided to produce at least one additional pulse channel similar to the said first channel and at least one additional pulse channel similar to the said second channel, means for gating the outputs of the additional channels and feeding same to separate pulse counters whereby a plurality of different sub-areas of the scintillation window may be under observation.

References Cited
UNITED STATES PATENTS

| | | | |
|---|---|---|---|
| 3,011,057 | 11/1961 | Anger | 250—71.5 |
| 3,046,401 | 7/1962 | Feldman et al. | 250—208 |
| 3,108,772 | 10/1963 | Pelino | 250—83.3 X |
| 3,209,201 | 9/1965 | Anger | 250—71.5 X |

RALPH G. NILSON, *Primary Examiner.*

S. ELBAUM, *Assistant Examiner.*